Oct. 25, 1960 V. C. ANDERSON 2,958,039

DELAY LINE TIME COMPRESSOR

Filed May 18, 1956 4 Sheets-Sheet 1

VICTOR C. ANDERSON,
INVENTOR.

HUEBNER, BEEHLER,
WORREL & HERZIG,
ATTORNEYS.

BY Albert M. Herzig

DELAY LINE TIME COMPRESSOR

Filed May 18, 1956

VICTOR C. ANDERSON,
INVENTOR.
HUEBNER, BEEHLER,
WORREL & HERZIG,
ATTORNEYS
BY
Albert M. Herzig Oct. 25, 1960 V. C. ANDERSON 2,958,039

DELAY LINE TIME COMPRESSOR

Filed May 18, 1956 4 Sheets-Sheet 3

VICTOR C. ANDERSON,
INVENTOR.
HUEBNER, BEEHLER,
WORREL & HERZIG,
ATTORNEYS
BY
Albert M. Herzig VICTOR C. ANDERSON,
INVENTOR.
HUEBNER, BEEHLER,
WORREL & HERZIG,
ATTORNEYS
BY Albert M. Herzig United States Patent Office 2,958,039

Patented Oct. 25, 1960

2,958,039

DELAY LINE TIME COMPRESSOR

Victor C. Anderson, San Diego, Calif., assignor to The Regents of the University of California, Berkeley, Calif., a corporation Filed May 18, 1956, Ser. No. 585,827

7 Claims. (Cl. 324—77)

This invention relates to a signal processing method, and particularly to an analysis technique involving a time compression correlator which generates correlation functions on a real time base.

In one of its aspects, the invention involves the use of a high speed delay line and appropriate sampling techniques to sample an incoming low frequency signal at a low rate and reproduce it at a much higher time rate for the purpose of analysis of the signal—in particular to obtain a frequency spectrum.

The term Deltic (an abbreviation for Delay line Time Compressor) is applied to a time compression scheme which makes it possible to apply continuously, without loss of any information, signal "processing" methods such as spectrum analysis, and cross- or autocorrelation analysis to enhance the signal-to-noise ratio of an incoming signal. Time compression in the Deltic is accomplished by sampling a portion of an incoming low frequency signal, of duration T′, at N different times separated by the shorter interval, or "sampling" period T. The sequence of N nearly instantaneous samples obtained in this manner is then squeezed together to form a high speed replica of the incoming signal—a replica having a smaller total duration just equal to T, the interval between samples. The information of the original signal is now contained on a compressed time scale in this high speed replica where the time compression factor is given by T″/T′, which is equal to N, the number of samples. This replica is then stored in a high speed recirculating storage channel of recirculation period T so that the compressed information is readily and repetitively available for the convenient application of signal processing methods.

In practice, this time compression and sampling process is carried out in a continuous manner by removing the oldest sample in the replica and replacing it with a new one each time the replica completes another cycle of circulation in the storage channel. In other words, each sample selected from the incoming low frequency signal is introduced at the beginning of the replica; it then processes slowly through the replica until, after an interval T′, it will have appeared N times at the output of the storage channel in the course of progressing from the beginning to the end of the sequence of samples, after which it is removed.

In the typical signal processing methods mentioned above, the incoming signal is usually to be multiplied by some comparison signal and the product then averaged over a short but finite length of time. Ordinarily this multiplying and averaging process must be carried out many times on the same signal while varying some parameter of the comparison signal, such as the frequency, in the case of the spectrum analysis, or the relative time delay, in the case of correlation analysis. By using the time compression properties of the Deltic, processing operations which would involve averaging times of T′ on the original signal can be carried out equally well on the high speed replica with the much shorter averaging time T. In this way, N multiplying and averaging operations may be carried out within the duration of the original signal T′. This factor of N is exactly that required to extract all of the information in a signal of length T′ during a time interval T′ by the above signal processing methods.

As a result of the time compression of the high speed replica, all of the frequencies in the spectrum of the original signal are multiplied by a factor N. If a spectrum analysis of the incoming signal is desired, it may be obtained by feeding the replica to a conventional sweep-spectrum analyzer covering the multiplied high frequency band. The analyzer operating in this high frequency region will have a wider filter bandwidth with a correspondingly shorter response time. Thus a spectrum resolution which would require a filter having a response time of T′ if operating on the original signal, may be obtained with a filter having the response time T operating on the compressed replica. Because of the shorter filter response time, the spectrum level may be determined for N separate frequencies in the band during the time that would have been required to obtain the spectrum level at a single frequency by operating on the original signal without benefit of a Deltic.

The short-term autocorrelation function of a signal is obtained by multiplying a sample of incoming signal of length T′ by a corresponding sample which has been delayed slightly. The instantaneous product is averaged over the length of the sample T′, and this process of multiplication and averaging is then repeated for a series of different relative delay times. The output of the multiplier-averager plotted against the relative delay time is the correlation function desired. In the Deltic, the relative time delay is achieved by making use of the precession of data samples through the high speed replica as described previously. A second storage channel is used to provide a "stationary" reference or comparison signal which consists of the sample sequence in the replica at an arbitrary time $t_0$. This "stationary" replica is then multiplied by the precessing replica in the Deltic and averaged over the recirculation period T. In each successive recirculation period, the relative delay between the "stationary" replica and the precessing replica increases by one sampling interval; thus, at the end of a time interval equal to the length of the original low-frequency signal (now represented by the time-compressed replica), the average product will have been obtained for N different values of delay. These N delay values correspond to a total time delay for the correlation function of T′ which is just equal to the length of the original signal. After the period T′, a new replica may be placed in the "stationary" storage channel, and a new short term correlation function be obtained during the next time interval T′. In this way, none of the information in the incoming signal will be lost since there will be no gaps between successive segments of the signal which are "processed" one after the other.

The cross correlation of two independent input signals can be obtained by using a Deltic for each input to obtain a high speed replica of each signal. The replica of one of the input signals may then be stored in the "stationary" storage channel, and compared with the precessing replica of the other input signal.

A more detailed description of specific embodiments of the invention is given with reference to the drawings, wherein:

Figure 1*a* is a diagrammatic view showing an input signal, an octave band of thermal noise;

Figure 1*b* is a similar view showing a correlator output before integration by a dielectric recorder;

Figure 1*c* shows the output of a dielectric recorder;

Figure 2*a* is a view similar to that of Figure 1*a* showing an input signal, a sine wave signal 25 db lower than the noise;

Figure 2*b* is a similar view showing a correlator output before integration by a dielectric recorder;

Figure 2*c* shows the output of a dielectric recorder with the signal off;

Figure 2*d* shows the output of a dielectric recorder with the signal on;

It would appear from the foregoing that the averaging time of such a Deltic correlator would be limited to the length of the original signal, T'. As far as the Deltic correlator itself goes, this is true; but the averaging time can be extended by superimposing a number of the correlation curves so obtained to form a composite average. This additional time averaging would be incorporated into any practical correlation "processing" system to obtain the desired signal-to-noise ratio enhancement. Such an additional time average has been accomplished in an actual Deltic correlator by the use of a dielectric recorder in which the average of a large number of correlation sweeps is built up as an electrostatic surface charge pattern on a rotating dielectric coated drum. By using this technique the effective averaging time which is an important factor in the signal-to-noise enhancement of any such processing system may be increased almost without limit.

The feasibility of the system which has been described has been demonstrated by the construction and successful operation of a complete Deltic cross-correlator. This Deltic has a time compression factor, N, of 300 and stores 10 ms. of incoming low frequency signals having a bandwidth from 100 to 15 kc./s. The averaging time has been extended from the basic 10 ms. of the Deltic correlator itself to a time which may be varied between .1 sec. and 100 sec. by the addition of a dielectric recorder at the correlator output.

Figure 1A:
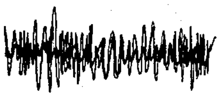
Figure 1B:
Figure 1C:
Figure 2A:
Figure 2B:
Figure 2C:
Figure 2D:

Extensive signal to noise measurements on this Deltic have shown agreement to within 0.8 db of the theoretical background noise for integration times ranging from the basic 10 ms. to a drum integration time of 1 sec. The effect of this noise reduction is shown in Figs. 1*a* to 1*c*. Fig. 1*a* shows the input signal, an octave band of thermal noise, 1600–3200 c.p.s., which is composed of two parts: an incoherent noise, having the above octave band spectrum, and a signal 25 db lower in power also having the same spectrum. Fig. 1*b* shows the output of the correlator, before further integration by the dielectric recorder, where the noise plus signal of 1*a* is introduced in one input of the Deltic, and is cross-correlated with a delayed replica of the signal which is fed to the other input. Fig. 1*c* illustrates the manner in which the dielectric drum integration may be used to reduce the background fluctuation. The correlation function of the low level signal present in 1*a* is now readily detected in the center of the 10 ms. sweep.

Fig. 2 shows a similar test with a sine wave signal 25 db lower than the noise.

A list of materials used in constructing the Deltic correlator is given below:

BILL OF MATERIALS FOR THE DELTIC CORRELATOR 4 quartz ultrasonic delay lines: Time delay, 30 μsec.; center frequency of transducers, 30 mc./s.; attenuation into 500 Ω, 50 db.

4 band pass amplifiers: Center frequency, 30 mc./s.; bandwidth, 10 mc./s.; 55 db gain; (7 tubes each).

3 gating chassis: Function; reclocking, data insertion, erasing (5 tubes each).

1 sampling pulse generator: Includes reclocking gate as above and supplies ± gating pulses to sample incoming data (7 tubes).

1 clocking oscillator chassis: Oscillator frequency, 10 mc./s.; automatic frequency control locked to the delay line (4 tubes).

2 frequency divider chassis: Scale of 32, and scale of 10; generates 100 c./s. signal for dielectric recorder motor driving amplifier and transfer gating pulses for the secondary storage channel (11 tubes).

1 multiplier chassis: Provides: reclocking gates for sum and difference signals, inverter stage, and cathode follower output (5 tubes).

1 dielectric recorder recording and reproducing amplifiers (3 tubes).

1 70 watt driving amplifier for recorder motor.

1 power supply: 225 v. at 600 ma. regulated; 6.3 v. at 20 amps.

Total tube complement: 110.

Below is given a tabulated summary of characteristics of the constructed Deltic correlator:

*Table of typical Deltic characteristics*

| | | | | | |
|---|---|---|---|---|---|
| Delay line length required ______ μsec.. | 30 | 100 | 300 | 1000 | 3000 |
| Pulse separation in line ___________ μsec.. | .1 | .1 | .1 | .1 | .1 |
| Length of stored record __________ sec.. | .009 | .1 | .9 | 10 | 90 |
| Length of correlation sweep for 100% processing ______ sec.. | .009 | .1 | .9 | 10 | 90 |
| Max. frequency of input signal _____ kc.. | 16.5 | 5 | 1.65 | [1] 500 | [1] 165 |
| Correlation delay resolution _____ μsec.. | 30 | 100 | 300 | 1000 | 3000 |
| Max. frequency resolution _____ c./s... | 110 | 10 | 1.1 | .1 | .011 |
| Time compression factor or the number of analysis points per sweep ____ | 300:1 | 1000:1 | 3,000:1 | 10,000:1 | 30,000:1 |

[1] c./s.

Figure 3:
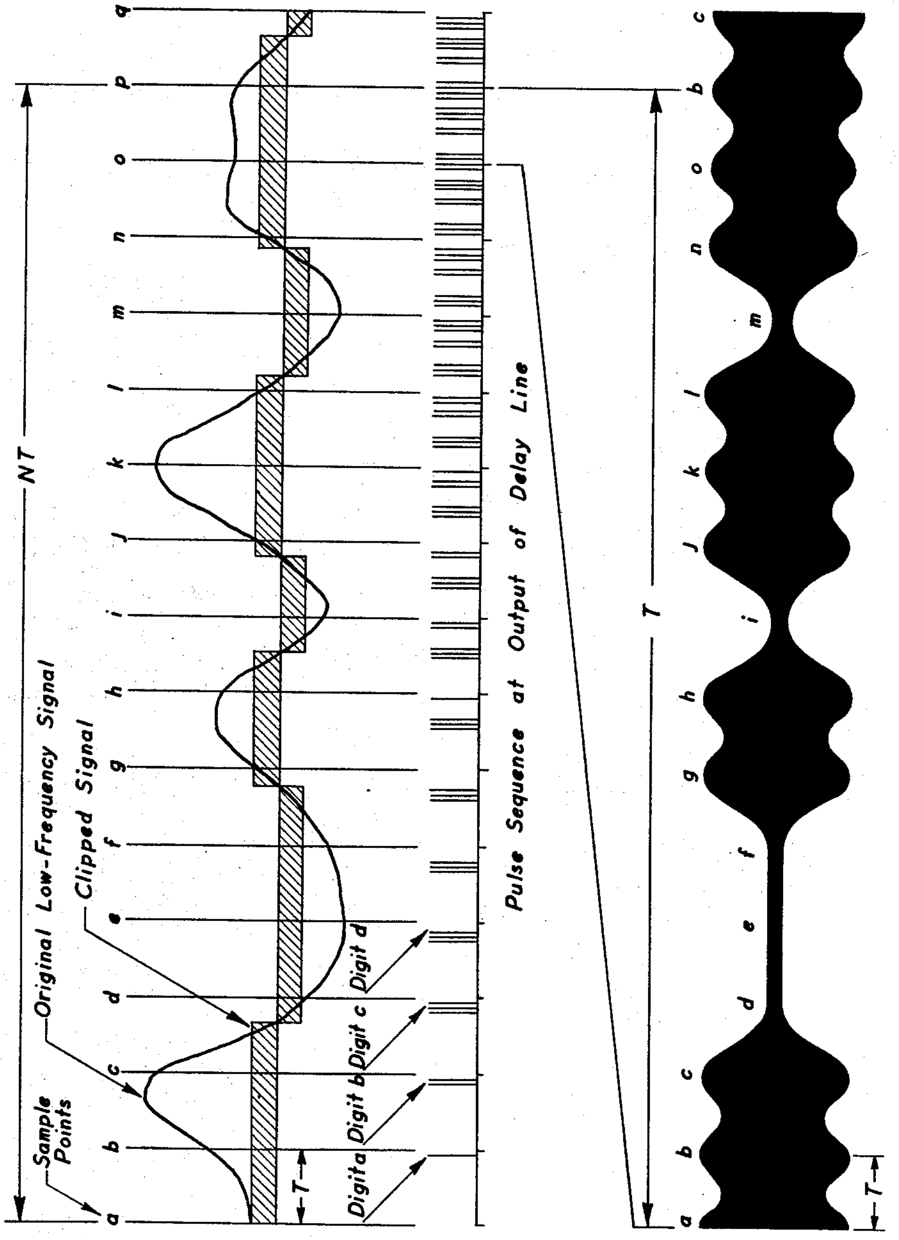
Figure 3 is a diagrammatic view graphically illustrating the sampling process used in a delay line time compressor.

An illustration of the sampling process used in the Deltic is shown in Fig. 3. The original low-frequency signal is shown in the upper part of the figure by the undulating line. The vertical lines shown with the separation of T represent the times at which a sampling pulse will introduce the new information into the recirculating memory which has a recirculation time $T-\tau$. The sequence of pulses at the output of the delay line is shown in the center of the figure where the pulses are represented by the short vertical lines appearing above the base line. The expanded view at the bottom of the figure represents the actual form of the envelope of the signal at the output of the delay line for 1 repetition peroid T. Since the storage is binary in nature, only the polarity of the low-frequency signal is introduced as information into the line. This is an extreme case of quantitization in amplitude, but for random signals does not give rise to an objectionable loss of signal-to-noise ratio information.

The basic parameters of the Deltic are related by simple equations which define the operating limits of this technique. The parameters which characterize the operation of the Deltic correlator are as follows:

$T$ = the sampling pulse period, pulse train length, or delay line recirculation peroid.

$\tau$ = the clock pulse period or the digit separation in the pulse train.

$N$ = number of digits in the pulse train.

$f_0$ = maximum allowable frequency of incoming signal as determined by Shannon's sampling theorem.

$T'$ = the length of the low-frequency signal represented by all the information in the pulse train.

$M$ = the number of sample pulse periods in the correlation sweep.

$T_1$ = the correlation sweep range.

$T_2$ = effective post-detection integration time.

These are related in the following manner:

$N=T/=T'/T$ (3).
$f_0=\frac{1}{2}T$ (4).
$T_1=MT$.
$T_2=T'$ without dielectric recorder averaging.
$T_2=k$ (dielectric recorder time constant).

where:

$$k=\begin{cases} N \text{ for } MN. \\ M. \\ 1 \text{ for } MN. \end{cases}$$

The operation of the sampling process may be understood by following the sequence of sampling pulses and their associated data pulses in the line. At sample point ($a$) the positive polarity of the low-frequency signal is introduced as a pulse into the delay line. At the end of the recirculation period $T-\tau$ this pulse appears at the end of the delay line as shown by digit ($a$) in the center of Fig. 3. One digit later, i.e. at point $b$, the sampling pulse introduces a new data sample which again corresponds to a pulse because of the positive polarity of the low-frequency signal at that instant of time, and this pulse is circulated through the line, appearing on the output after a period $T-\tau$. In the meantime the digit ($a$) has been re-entered into the line and has appeared at the output just ahead of digit ($b$) or two digit spaces before the sampling pulse. The process continues as illustrated in the figure.

When the polarity of the incoming low-frequency signals is negative, the information is conveyed by the absence of a pulse as illustrated by digit ($d$) in the output of the delay line. After the line is completely full, the sampling pulse operates, not only to introduce new information into the line, but also to erase the data pulse which normally would be advanced to the sampling pulse position. The redundancy of the output of the delay line is illustrated by the fact that a single data sample appears in the output N times where N is the number of pulses in a pulse train of duration T. By virtue of this redundancy, one may look at the high-frequency replica of the low-frequency signal a large number of times during the storage period of a single data sample.

This sampling process has special properties which are important when using the Deltic to compute correlation functions. First, it should be noted that each of the pulse trains (i.e., a complete time sequence of samples) as illustrated at the bottom of Fig. 3 is 1 digit longer than the basic recirculation time $T-\tau$. It should also be noted that a single data sample in the pulse train advances by 1 digit position each sampling interval. This relative time advance of the high-frequency replica of the low-frequency signal makes the Deltic ideally suited to the generation of auto-correlation and cross-correlation functions.

Before describing the manner in which these functions are generated, it is perhaps best to define exactly what is meant by correlation function as used here. The general correlation function is given by:

$$Pxy(\delta)=\lim_{T\to\infty}\frac{1}{T}\int_0^T x(t)y(t-\delta)\,dt \qquad (1)$$

where $Pxy(\delta)$ is the general correlation function, $x(t)$ is a time varying function and $y(t)$ is another time varying function. Generally speaking the experimental correlation function of two random signals can never be exactly determined in practice since an infinite integration time is indicated, as is a continuum of values of $\delta$. In practice, only finite integration times are employed for analysis, and $P(\delta)$ is evaluated at discrete values of $\delta$. The approximate correlation functions obtained in this manner are called short-time correlation functions and introduce a certain amount of noise or uncertainty in the resulting function. The properties and applications of such short-time correlation functions have been discussed by several authors, among them R. M. Fano, "Short Time Auto Correlation Function and Power Spectra," J. Acoust. Soc. Am. 22, 546–550 (December 1950); and J. Faran and R. Hills, T.M. 27, Harvard University Acoustics Research Laboratory.

The correlation functions generated by the Deltic are further approximations to the short-time correlation functions. The sampling process of the Deltic quantizes the incoming $x$ and $y$ signals into pulse trains, and the product of these pulse trains is averaged over the length of the stored sample to generate the points on the correlation curve. The nature of the approximate correlation functions generated by the Deltic is shown by the equation:

$$Pxy(mT)=\frac{1}{N}\sum_{N=o}^{N}\hat{x}(n\tau)\hat{y}(n\tau-m\tau) \qquad (2)$$

where the quantities N, T and $\tau$ correspond to the parameters of Fig. 3 and the functions $\hat{x}$ and $\hat{y}$ are the clipped, time-compressed replicas of the original functions. $m$, $n$ and N are all integers, and $m$ takes on values between $o$ and M. It can be seen from this expression that the effective integration time is equal to the sample length (NT). In operation this summation is carried on in a progressive manner, $m$ changing by one integer each time that $n$ runs through the range $o$ to N. Thus it can be seen that the correlation function $Pxy(mT)$ is generated on the same time base as the original signal. If $m=n$, the correlator sweep range which is equal to the time spent in the analysis will also be equal to the length of the stored signal, and the analysis will be performed with no loss of incoming information. The index $n$ corresponds to the position of a digit in the pulse train while $m$ is the position index of a pulse train in the correlation sweep.

The effective integration time of the summation indicated in Eq. 2 is equal to the length of the low-frequency signal which is stored in the pulse train. This effective integration time is determined by the system parameters, and once the length of the delay line and the clock pulse period have been chosen, it may not be changed. It is possible, however, to extend the effective integration time of the Deltic correlator output by summing over a number of consecutive correlation sweeps which occur with the period of the transfer pulse. This additional summation is accomplished with the use of a dielectric recorder in which an average of many sweeps is built up as an electrostatic surface charge pattern on a synchronous dielectric coated drum. With the use of this dielectric recorder the integration times of the Deltic correlator have been extended from the basic 10 millisecond period to a period which may be adjusted between $\frac{1}{10}$ of a second and 100 seconds.

The three independent Equations of 3 and 4 fix the number of independent parameters at two out of the first six listed hereinbefore. Regardless of which two parameters are used as design criteria, the Deltic characteristics are ultimately determined by the selection of values of T and $\tau$. Both $T_1$ and $T_2$ may be varied independently by a suitable choice of M and recorder time constant respectively.

The Deltic correlator constructed has been designed for a maximum frequency of 15 kc. to cover the audio spectrum, with a clock pulse period of 0.1 μsec. which was considered to be a realistic minimum period for the present state of the art. The choice of these two parameters fixed the first 5 as follows:

$T=30.7$ μsec. (30 μsec. quartz delay line + .7 μsec. amplifier and cable delay)
$\tau=.1$ μsec.
$N=307$
$f_0=16.3$ kc./sec.
$T'=9.42$ ms.

The length of the correlator sweep was chosen as close as convenient to the length of stored signal so that the information processing would be nearly 100% effective. M was fixed by a 320:1 scaler used as a frequency divider. This gave a value for $T_1$ of $$T_1=9.82 \text{ ms.}$$

Since $M \simeq N$, the effective integration time is equal to the time constant of the dielectric recorder which may be adjusted over a range of .1 to 100 sec.

Figure 4:
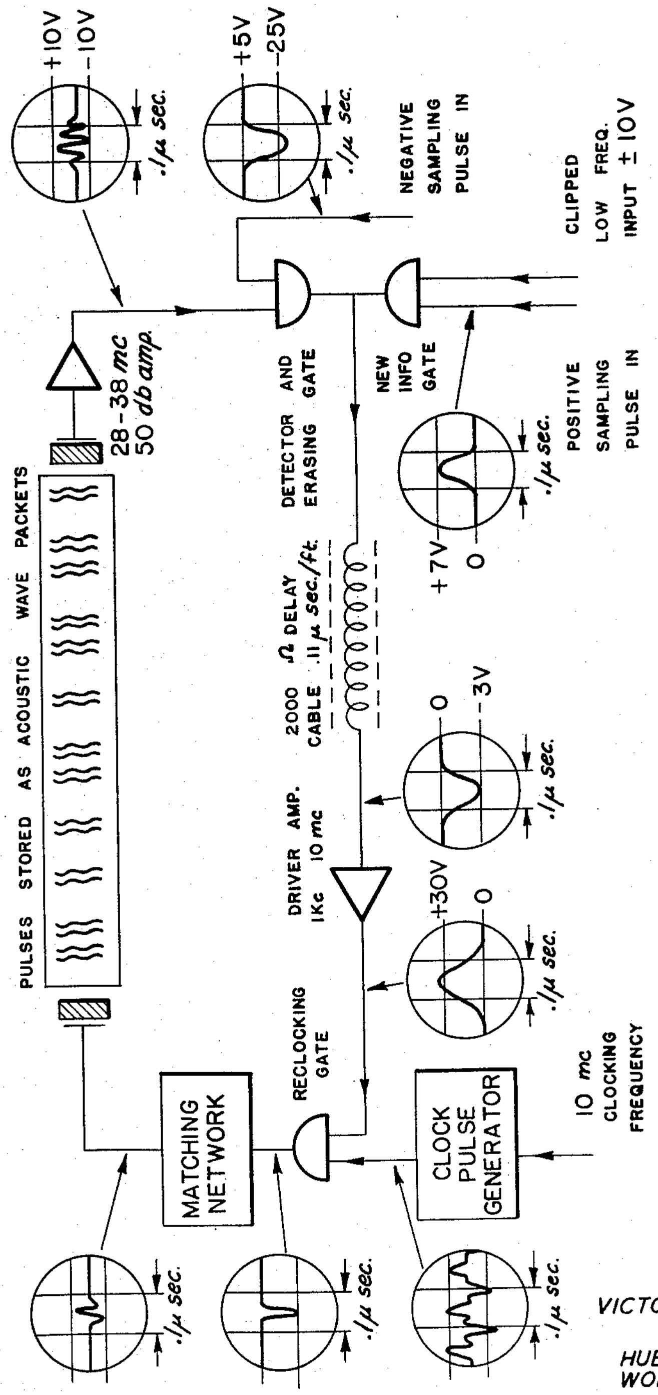
Figure 4 is a block diagram illustrating the manner in which an ultrasonic delay line is incorporated into a memory circuit.

The block diagram of Fig. 4 illustrates the way in which an ultrasonic delay line is incorporated into a memory circuit. The wave forms of the voltages at various parts of the circuits are shown in the figure to further aid in understanding the operation of such a delay line memory.

To describe the operation of this circuit, we may consider a pulse arriving at the input to the driver amplifier. The pulse after passing through the driver amplifier enters the reclocking gate where it is mixed with the clocking pulse, a very narrow pulse of approximately .02 microsecond duration and a ten megacycle repetition rate. The reclocking gate has a saturation characteristic so that input pulse heights from the driver amplifier which exceed a threshold of approximately 20 volts will give an essentially constant impulse to the matching network, while signals which are under 10 volts will give essentially a zero impulse to the matching network. The current pulse out of the reclocking gate is always in phase with the clocking pulse, and it can be seen that variations of the relative position of the recirculating pulse from the driver amplifier and the clocking pulse will be corrected for variations of as much as ±.02 microsecond. The current pulse of the reclocking gate rings the matching network and excites the acoustic transducer on the quartz delay line, introducing a packet of acoustic waves which progress through the quartz to the output transducer. At the output transducer the acoustic signal is converted back to an electrical signal with a loss in amplitude. A band pass amplifier having a gain of approximately 50 db is used to restore the electrical pulse output of the line to a level which will operate the detector.

In the absence of a sampling pulse in either the erasing gate or the new information gate, the detected output of the band pass amplifier will be fed through a section of delay cable to the driver amplifier and reintroduced into the delay line as before. The delay cable is used to trim the over-all delay path to match an integer multiple of the clock pulse period. It can be seen that once a pulse is introduced into this regenerative loop it will be recirculated in its proper relative position in a pulse train and at a constant amplitude indefinitely. The erasing gate and the new information gate are used to introduce and remove data pulses from the recirculating loop.

Two or more recirculating or dynamic memories of this type (more conveniently called channels) are required to form the Deltic. The circuit of Fig. 4 is a sampling channel which is used to convert the low-frequency incoming signal to the high-frequency recirculating pulse train. The term Deltic should be applied in the strict sense to this sampling channel, for it is here that the time compression is accomplished.

One other channel must be used to generate the sampling pulse which was indicated in the right-hand corner of Fig. 4, and to control the 10 megacycle clocking frequency which drives the clock pulse generator. This channel, called the sampling pulse channel, is arranged so that one and only one pulse is recirculating at one time. The over-all recirculation period or time delay of this channel is extended 1 digit by increasing the length of the delay cable between the detector and erasing gate and the driver amplifier so as to generate a sampling pulse of a repetition period T which is 1 digit, or in the instant case, 1/10 of a microsecond longer than that of the sampling channel of Fig. 4. An automatic frequency control on the 10 megacycle clocking oscillator locks the phase of the 10 megacycle signal to the phase of the sampling pulse which is recirculating in this line. In this way the clocking oscillator is always locked to a sub-multiple of the fundamental repetition period of the line, thus providing compensation for temperature changes in the acoustic delay line or in the clocking oscillator tank circuit itself.

Figure 5:
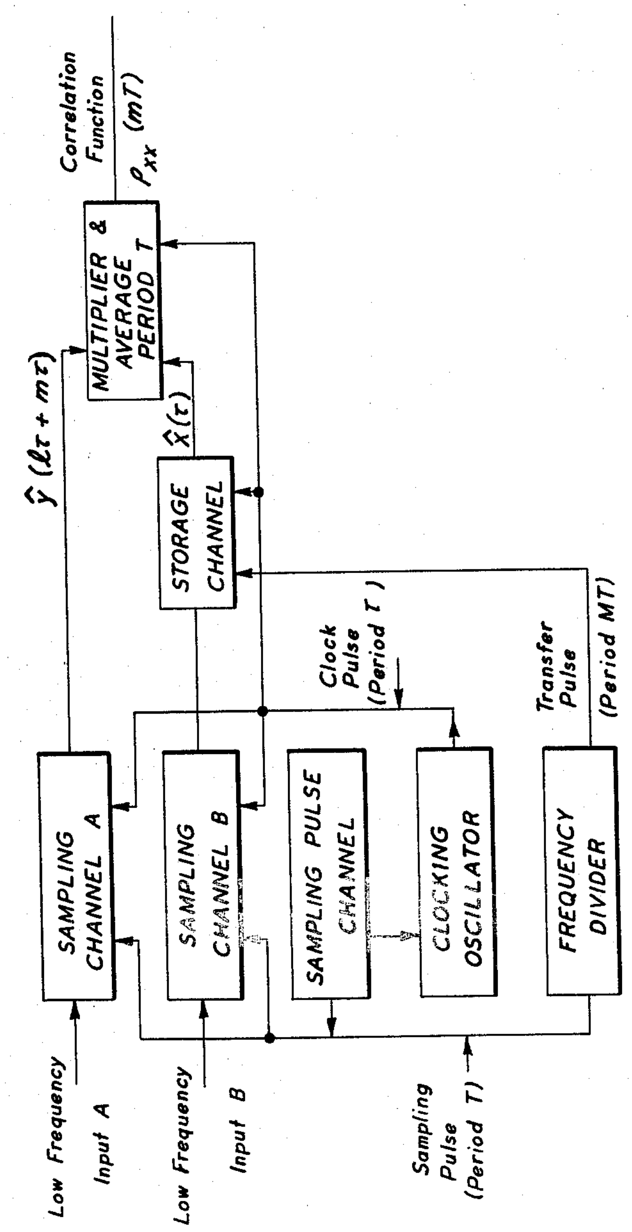
Figure 5 is a diagrammatic view showing the components of a Deltic correlator.

The components of a Deltic correlator are shown in Fig. 5. In addition to the channels previously described it is necessary to have a storage channel. This storage channel is a channel operated in such a way that one complete pulse train may be introduced from a sampling channel and re-cycled indefinitely. The recirculation period of the storage channel is equal to T so that the start and end of the pulse trains in both a sampling channel and a storage channel will be synchronized. The high-frequency output of the storage channel will be the $\hat{x}$ $(m\tau)$ of Eq. 2 and the output of the sampling channel $(a)$ represents the function $\hat{y}$ $(m\tau+n\tau)$ in Eq. 2. The summation indicated by Eq. 2 is carried out by feeding both the output of sampling channel A and the output of the storage channel into a multiplier and averager of averaging period T.

The frequency divider shown at the bottom of Fig. 5 generates the transfer pulse which is a pulse of duration T occurring at a repetition period of $m$T. This transfer pulse is used to transfer the pulse train from sampling channel B into the storage channel. Thus, the correlation function which is the output of the multiplier and averager is re-cycled at the end of a period $m$T during which time the correlation delay variable has been swept over a range from $o$ to $m$T.

While the invention has been shown and described herein in what is believed to be the most practical and preferred embodiment, it is recognized that departures can be made therefrom, within the scope of the invention, which is not to be limited to the details disclosed herein, but is to be accorded the full scope of the claims so as to embrace any and all equivalent structure and method.

Having described the invention, what is claimed as new and desired to secure by Letters Patent is:

1. Delay line time compressor apparatus comprising a first sampling channel means for receiving a first low frequency input signal and converting it to a first high frequency recirculating pulse train, a second sampling channel means for receiving a second low frequency input signal and converting it to a second high frequency recirculating pulse train, a storage channel means associated with the second sampling channel means for introduction of a pulse train from the sampling channel means and recirculating continuously in the storage channel means, the recirculation period of the storage channel means and the second sampling channel means being equal and a multiplier and averager means associated with the first sampling channel means and the storage channel means having the same period as the storage channel means and adapted to receive both the output of the first sampling channel means and of the storage channel means.

2. Signal analyzing apparatus comprising input terminal means adapted to receive an incoming signal to be analyzed, means for effecting periodic, substantially instantaneous polarity samples of said incoming signal at predetermined time intervals T2, storage means having input and output for passing the signal sample and storing the same for a predetermined time T3, less than T2 by a time T4, T4 being the time separation between adjacent pulses passing through said storage means, and reapplying means for reapplying the stored signal from the output of said storage means to the input thereof, thereby to create a circulating replica of the incoming signal, time-compressed by a ratio of $T2/T4$.

3. Signal analyzing apparatus comprising input terminal means adapted to receive an incoming signal to be analyzed, means for effecting periodic, substantially instantaneous polarity samples of said incoming signal at predetermined time intervals T2, storage means having input and output for passing the signal sample and storing the same for a predetermined T3, differing from T2 by a predetermined time T4, T4 being the time separation between adjacent pulses passing through said storage means, and reapplying means for reapplying the storage signal from the output of said storage means to the input thereof, thereby to create a circulating, time-compressed replica of the incoming signal.

4. Signal analyzing apparatus comprising input terminal means adapted to receive an incoming signal to be analyzed, means for effecting periodic, substantially instantaneous polarity samples of said incoming signal at predetermined time intervals T2, storage means having input and output for passing the signal sample and storing the same for a predetermined time T3, differing from T2 by a predetermined time T4, T4 being the time separation between adjacent pulses passing through said storage means, reapplying means for reapplying the stored signal from the output of said storage means to the input thereof, thereby to create a circulating, time-compressed replica of the incoming signal, and new information gate means for applying to said storage means new information pulses spaced apart by a time interval T2, in response to a predetermined magnitude of an incoming signal applied to said new information gate means.

5. Signal analyzing apparatus comprising input terminal means adapted to receive an incoming signal to be analyzed, sampling means for effecting periodic, substantially instantaneous polarity samples of said incoming signal at predetermined time intervals T2, storage means having input and output for passing the signal sample and storing the same for a predetermined time T3, differing from T2 by a predetermined time T4, T4 being the time separation between adjacent pulses passing through said storage means, reclocking gate means for applying pulses to said storage means and gated from said sampling means, and pulse generator means for applying to said reclocking gate means pulses spaced apart by said predetermined time T4.

6. Signal analyzing apparatus comprising input terminal means adapted to receive an incoming signal to be analyzed, sampling means for effecting periodic substantially instantaneous polarity samples of said incoming signal at predetermined time intervals T2, storage means for passing the signal sample and storing the same for a predetermined time T3, differing from T2 by a predetermined time T4, reapplying means for reapplying the stored signal from said storage means back to the input thereof, thereby to create a circulating, time-compressed replica of the incoming signal, and erasing gate means for preventing reapplication of any given stored signal by said reapplying means after said given signal has circulated and recirculated in said storage means for a predetermined time T5, substantially equal to $(T2)^2$ divided by T4.

7. Signal analyzing apparatus comprising sampling means for effecting periodic, substantially instantaneous polarity samples of an incoming signal at time intervals T2, means for time compressing the sequence of signal samples to a predetermined interval of time T4 between signal samples, T4 being appreciably less than T2, said time compressing means including circulating means for circulating a sequence of signal samples, and means for withdrawing from the circulating means the oldest of the signal samples in the circulating sequence and inserting in its place into said circulating means a new signal sample.

References Cited in the file of this patent

UNITED STATES PATENTS

| | | |
|---|---|---|
| 2,151,091 | Dudley | Mar. 21, 1939 |
| 2,545,871 | Bell | Mar. 20, 1951 |
| 2,629,827 | Eckert | Feb. 24, 1953 |
| 2,676,206 | Bennett et al. | Apr. 20, 1954 |
| 2,679,551 | Newby | May 25, 1954 |
| 2,691,727 | Lair | Oct. 12, 1954 |
| 2,732,424 | Oliver | Jan. 24, 1956 |
| 2,766,325 | DiToro | Oct. 9, 1956 |
| 2,800,580 | Davies | July 23, 1957 |
| 2,840,308 | Van Horne | June 24, 1958 |
| 2,883,109 | Oshima | Apr. 21, 1959 |